(12) United States Patent
Kamiyama et al.

(10) Patent No.: US 10,421,520 B2
(45) Date of Patent: Sep. 24, 2019

(54) SADDLE RIDING TYPE VEHICLE

(71) Applicant: HONDA MOTOR CO., LTD., Tokyo (JP)

(72) Inventors: Takeshi Kamiyama, Yoshikawa (JP); Kazuhiro Shimazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/685,396

(22) Filed: Aug. 24, 2017

(65) Prior Publication Data

US 2018/0057109 A1 Mar. 1, 2018

(30) Foreign Application Priority Data

Aug. 31, 2016 (JP) ................. 2016-170213

(51) Int. Cl.
| | |
|---|---|
| *B60N 2/40* | (2006.01) |
| *B62M 7/04* | (2006.01) |
| *B62J 1/02* | (2006.01) |
| *B62J 1/28* | (2006.01) |
| *B62J 7/04* | (2006.01) |
| *B62J 99/00* | (2009.01) |
| *B60N 2/75* | (2018.01) |
| *B62J 27/00* | (2006.01) |

(52) U.S. Cl.
CPC ............... *B62M 7/04* (2013.01); *B60N 2/40* (2013.01); *B60N 2/753* (2018.02); *B62J 1/02* (2013.01); *B62J 1/28* (2013.01); *B62J 7/04* (2013.01); *B62J 27/00* (2013.01); *B62J 99/00* (2013.01)

(58) Field of Classification Search
CPC .. B60N 2/753; B60N 2/40; B62M 7/04; B62J 1/02; B62J 1/28; B62J 99/00
See application file for complete search history.

(56) References Cited

U.S. PATENT DOCUMENTS

| | | | |
|---|---|---|---|
| 4,225,183 A | 9/1980 | Hanagan et al. | |
| 4,549,629 A | 10/1985 | Komuro | |
| 4,600,208 A * | 7/1986 | Morishima | ............. B62J 99/00 224/413 |
| 4,690,237 A | 9/1987 | Funabashi et al. | |

(Continued)

OTHER PUBLICATIONS

European Patent Office, European Search Report, application No. 17188244.2 dated Jan. 25, 2018.

*Primary Examiner* — Joseph M Rocca
*Assistant Examiner* — Michael R Stabley
(74) *Attorney, Agent, or Firm* — Squire Patton Boggs (US) LLP (57) ABSTRACT

A saddle riding type vehicle includes a seat which is supported by a vehicle body and on which a passenger is seated; and an arm rest which is provided to protrude at a side rear position of the seat of the vehicle body and on which an arm of a passenger who is seated on the seat is rested. The arm rest is supported by the vehicle body rotatably between a use position at which a front end part of the arm rest is directed to a vehicle body front direction and a retracted position at which the front end part of the arm rest is directed to a direction other than the vehicle body front direction. A rotation shaft of the arm rest is arranged to be directed to a vehicle body front upper direction from the side rear position of the seat of the vehicle body.

5 Claims, 8 Drawing Sheets

(56) References Cited

U.S. PATENT DOCUMENTS

| | | | | |
|---|---|---|---|---|
| 4,695,096 A | * | 9/1987 | Kincaid | B62J 1/28 297/411.31 |
| 4,915,187 A | * | 4/1990 | Nakashima | B62J 1/28 180/219 |
| 7,357,456 B1 | * | 4/2008 | Freer | A47C 7/543 297/411.38 |
| 8,246,057 B2 | * | 8/2012 | Daunais | B62J 1/28 180/218 |
| 8,491,055 B2 | * | 7/2013 | Freer, II | B60N 2/753 297/411.25 |
| 2015/0217663 A1 | | 8/2015 | Parvey | |

* cited by examiner

*FIG. 8*

SADDLE RIDING TYPE VEHICLE

CROSS-REFERENCE TO RELATED APPLICATION

Priority is claimed on Japanese Patent Application No. 2016-170213, filed on Aug. 31, 2016, the contents of which are incorporated herein by reference.

BACKGROUND

Field of the Invention

The present invention relates to a saddle riding type vehicle that includes an arm rest on which the arm of a passenger is rested.

Background

Saddle riding type vehicles that include an arm rest on which the arm of a passenger who is seated on a seat is rested are known (for example, refer to United States Patent Application Publication No. 2015/0217663).

In a saddle riding type vehicle described in United States Patent Application Publication No. 2015/0217663, a trunk case used for storing goods is arranged on a rear part of a seat on which a back passenger is seated, and an arm rest is attached to right and left trunk lid parts of the trunk case. The arm rest is arranged at right and left side rear positions of the seat. The arm rest is rotatably held by a bracket that is provided to protrude on the trunk lid. A rotation shaft of the arm rest is provided on the bracket along a vehicle width direction. When the arm rest is used, the arm rest is allowed to pivot frontward to be substantially horizontal. When the passenger mounts or dismounts, the arm rest is allowed to pivot upward.

SUMMARY

However, in the above-described saddle riding type vehicle of the related art, the rotation shaft of the arm rest is arranged along a vehicle width direction. Therefore, for example, when a passenger mounts or dismounts while forgetting to allow the arm rest to pivot upward, the passenger may come into contact with the arm rest, and a large load may act on the armrest. Further, in the above-described saddle riding type vehicle of the related art, the bracket that supports the arm rest extends in a vehicle front direction from the trunk lid, and therefore, it is necessary to keep away from the bracket when the passenger mounts or dismounts.

An object of an aspect of the present invention is to provide a saddle riding type vehicle that can allow an arm rest to be displaced between a use position and a retracted position and that is capable of reducing a load that acts on the arm rest when a load is input from a side of the arm rest in a state where the arm rest is at the use position while improving the easiness for a passenger to mount and dismount.

A saddle riding type vehicle according to an aspect of the present invention includes: a seat which is supported by a vehicle body and on which a passenger is seated; and an arm rest which is provided to protrude at a side rear position of the seat of the vehicle body and on which an arm of a passenger who is seated on the seat is rested, wherein the arm rest is supported by the vehicle body rotatably between a use position at which a front end part of the arm rest is directed to a vehicle body front direction and a retracted position at which the front end part of the arm rest is directed to a direction other than the vehicle body front direction, and a rotation shaft of the arm rest is arranged to be directed to a vehicle body front upper direction from the side rear position of the seat of the vehicle body.

According to the above configuration, when the arm rest is used, the arm rest is displaced to the use position at which the front end part of the arm rest is directed to the vehicle body front direction. When the arm rest is not used or when the passenger mounts or dismounts, the arm rest is rotated around the rotation shaft and is displaced to the retracted position.

The arm rest is rotated around the rotation shaft that is directed to the vehicle body front and upper direction from the side rear position of the seat. Therefore, when a load is input from a side of the arm rest in a state where the arm rest is at the use position, the arm rest is rotated and displaced to the retracted position direction around the rotation shaft. Accordingly, a large load does not easily act on the arm rest.

In the above saddle riding type vehicle, the arm rest may be supported by the vehicle body such that rotation in both right and left directions around the rotation shaft from a state where the arm rest is at the use position is allowed.

In this case, even when a load is input to the arm rest from any of the outer and inner directions in the vehicle width direction when the armrest is at the use position, the arm rest is rotated to the retracted position direction around the rotation shaft. Therefore, even in any of a case in which the passenger mounts and a case in which the passenger dismounts, even when the passenger forgets to displace the arm rest to the retracted position, the arm rest can be smoothly retracted at the time of the arm rest coming into contact with the passenger. Accordingly, when the configuration is adopted, it is possible to facilitate mounting and dismounting of the passenger.

The above saddle riding type vehicle may further include: a trunk main body that is arranged at a rear part of the seat and that has an upper part having a goods storage opening; and a trunk lid that is supported rotatably on a front part side of the goods storage opening by the trunk main body and that opens and closes the goods storage opening such that a rear part of the trunk lid is opened, wherein the rotation shaft may be held by a stay that supports the trunk lid such that the arm rest is directed to an upper direction of the vehicle body at the retracted position.

In this case, when the trunk lid is operated to be open or closed, the arm rest held by the stay of the trunk lid is rotated frontward or rearward in accordance with the rotation of the trunk lid. At this time, by displacing the arm rest in advance to the retracted position at which the arm rest is directed to the vehicle body upper direction, it is possible to prevent the arm rest from protruding in a front and lower direction of the vehicle in accordance with the opening operation of the trunk lid. Accordingly, it is also possible to ensure a sufficiently wide opening angle of the trunk lid while maintaining the extension length of the arm rest to be long. Therefore, when this configuration is adopted, it is possible to satisfy both of ensuring the arm resting stability of the arm rest and improvement of the usability of the trunk lid.

In the above saddle riding type vehicle, a holding part of the rotation shaft may be arranged inside the trunk lid.

In this case, the holding part of the rotation shaft of the arm rest does not protrude outside the trunk lid. Therefore, it is possible to make the extension length of the arm rest to be long by the amount in which the holding part of the rotation shaft of the arm rest does not protrude outside the trunk lid. Therefore, the maximally protruding position in the vehicle body front direction of the arm rest when the arm rest is displaced to the retracted position can be made to be a further rear position. Accordingly, when this configuration is adopted, it is possible to satisfy, at a further high level, both of ensuring the arm resting stability of the arm rest and improvement of the usability of the trunk lid.

In the above saddle riding type vehicle, a back rest that supports a dorsal region of the passenger who is seated on the seat may be provided on a front part of the trunk lid, and the back rest may be formed in a shape in which the back rest continues to the arm rest at the use position.

In this case, it becomes possible to use part of the back rest also as the arm rest, and the arm resting stability of the passenger is further enhanced.

According to an aspect of the present invention, the rotation shaft of the arm rest is arranged to be directed to the vehicle body front and upper direction from the side rear position of the seat of the vehicle body, and therefore, it is possible to freely displace the arm rest between the use position and the retracted position around the rotation shaft and further rotate the arm rest around the rotation shaft to be displaced to the retracted position when a load is input from the side of the arm rest in a state where the arm rest is at the use position. Accordingly, when the aspect of the present invention is employed, it is possible to reduce a load that acts on the arm rest when a load is input from the side of the arm rest in a state where the arm rest is at the use position. Further, in the aspect of the present invention, the rotation shaft of the arm rest is arranged to be directed to the vehicle body front and upper direction from the side rear position of the seat of the vehicle body, and therefore, it is possible to prevent the holding part of the rotation shaft from greatly protruding in the vehicle body front direction and enhance the easiness for the passenger to mount and dismount.

DESCRIPTION OF THE EMBODIMENTS

Hereinafter, an embodiment of the present invention will be described with reference to the drawings. Note that, front, rear, right, and left directions and the like in the following description are the same as front, rear, right, and left directions and the like of a vehicle described below if there is no particular description. In addition, in the drawings referred to in the following description, an arrow FR which indicates the front of the vehicle, an arrow LH which indicates the left of the vehicle, and an arrow UP which indicates the upside of the vehicle are shown.

Figure 1:
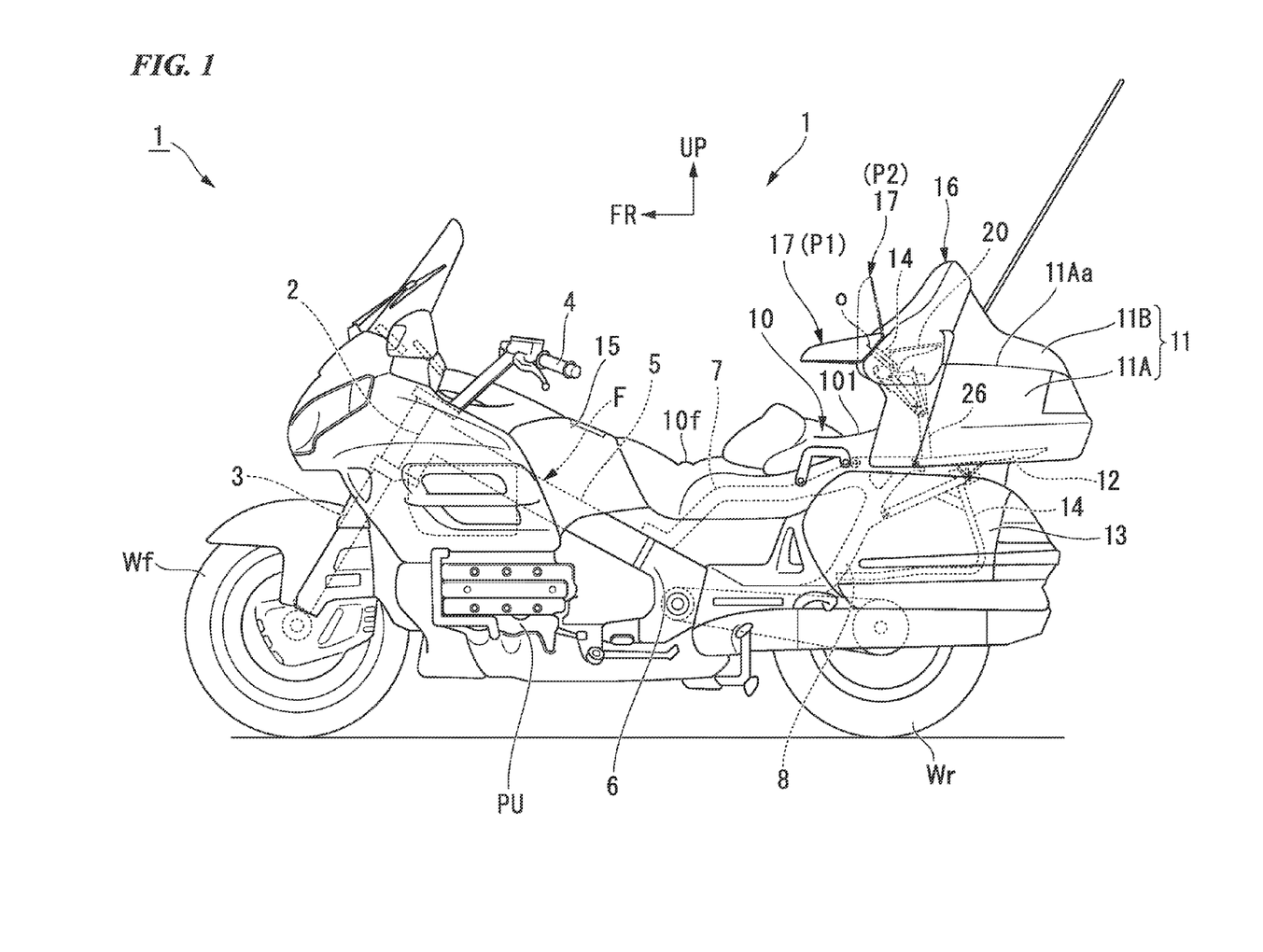
FIG. 1 is a side view of a saddle riding type vehicle according to an embodiment of the present invention.

FIG. 1 is a view of a motorcycle 1 as a configuration of a saddle riding type vehicle seen from the left side.

In the motorcycle 1, right and left front forks 3 are steerably held via a steering stem (not shown) by a head pipe 2 on the front end of a vehicle body frame F. A front wheel Wf is rotatably supported on the lower ends of the right and left front forks 3. A handle 4 used for steering the front wheel is attached to an upper part of the steering stem.

A pair of right and left main frames 5 extends diagonally downward and rearward from the head pipe 2. An upper end part of a right pivot frame 6 continues to a rear part of the right main frame 5. An upper end part of a left pivot frame 6 continues to a rear part of the left main frame 5. A power unit PU that includes an engine and a transmission is provided below the right and left main frames 5 and at a more front position than the right and left pivot frames 6.

A front end part of a swing arm (not shown) is pivotally supported swingably upward and downward by the right and left pivot frames 6. A rear wheel Wr is rotatably supported by a rear end part of the swing arm. A power is transmitted to the rear wheel Wr via a power transmission mechanism from the power unit PU.

A front end part of a right seat frame 7 that extends toward the vehicle body rearward direction is joined to an upper end part of the right pivot frame 6. A front end part of a left seat frame 7 that extends toward the vehicle body rearward direction is joined to an upper end part of the left pivot frame 6. A right support frame 8 that extends in the vehicle body rearward direction and that then extends diagonally rearward and upward is joined to a substantially middle position in the vertical direction of the right pivot frame 6. A left support frame 8 that extends in the vehicle body rearward direction and that then extends diagonally rearward and upward is joined to a substantially middle position in the vertical direction of the left pivot frame 6. A rear end part of the right support frame 8 is connected to a rear part of the right seat frame 7. A rear end part of the left support frame 8 is connected to a rear part of the left seat frame 7.

A fuel tank (not shown) is supported on a part over the right and left main frames 5 and the upper part of the pivot frame 6. A tandem seat 10 on which a driver and a passenger can be seated next to each other in the front-to-rear direction is supported by the right and left seat frames 7. The front upper region and both right and left side parts of the fuel tank is covered by a tank cover 15 at the front position of the seat 10. A front seat surface 10$f$ on which the driver is seated is arranged on the front part of the seat 10. A rear seat surface 10$r$ on which the passenger on the rear seat is seated is provided on the rear part of the front seat surface 10$f$ so as to heave and to have a step form.

A trunk stay 12 for fixing a trunk case 11 used for storing goods and a saddle bag stay 14 for supporting a saddle bag 13 used for storing goods at the right and left lower parts of the trunk case 11 are joined to rear end parts of the right and left seat frames 7 and rearward slanted parts of the right and left support frames 8. The trunk case 11 includes: a trunk main body 11A having an upper part having a goods storage opening 11Aa; and a trunk lid 11B that closes the goods storage opening 11Aa of the trunk main body 11A such that the goods storage opening 11Aa can be opened and closed. The trunk lid 11B is operated to be opened and closed such that the rear part of the trunk lid 11B is opened using a front part of the trunk main body 11A as a rotation pivot point as described below in detail.

A back rest 16 for supporting a dorsal region of the passenger who is seated on the rear seat surface 10r of the seat 10 and a pair of right and left arm rests 17 on which the arm of the passenger is rested are provided on the front part of the trunk case 11.

Figure 2:
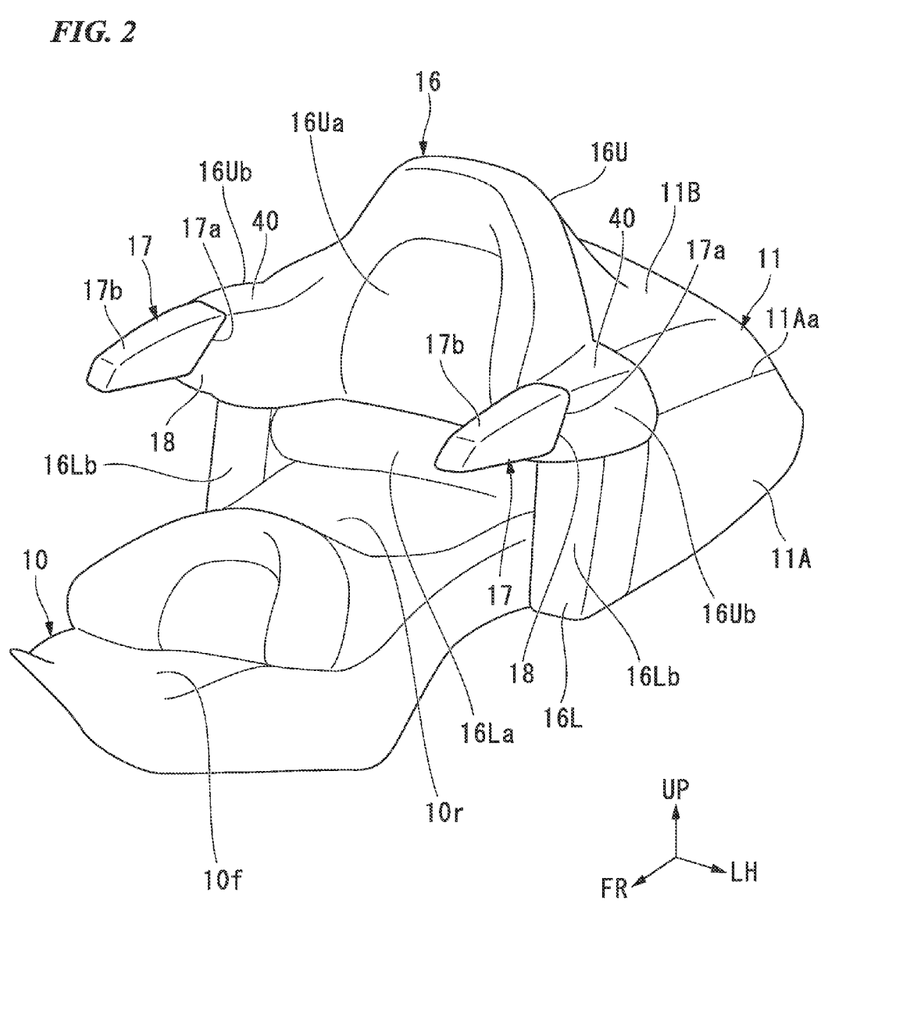
FIG. 2 is a perspective view showing part of the saddle riding type vehicle according to the embodiment.
Figure 3:
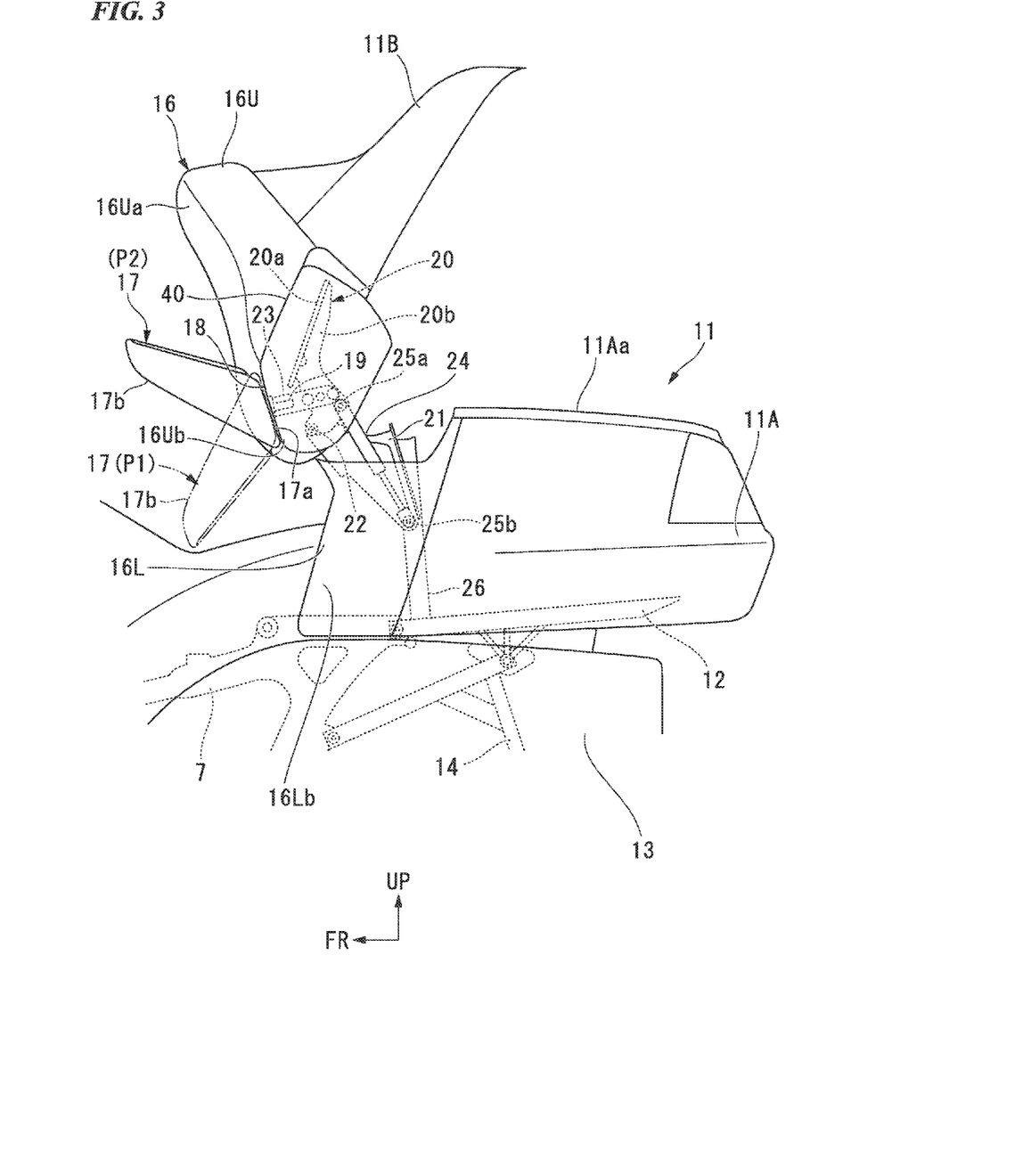
FIG. 3 is a side view showing part of the saddle riding type vehicle according to the embodiment.

FIG. 2 is a view of arrangement parts of the trunk case 11, the back rest 16, and the arm rest 17 seen from the left front upper side of the vehicle. FIG. 3 is a view of the arrangement parts of the trunk case 11, the back rest 16, and the arm rest 17 seen from the left side of the vehicle.

The back rest 16 includes: a back rest lower component 16L that is integrally attached to a front part of the trunk main body 11A; and a back rest upper component 16U that is integrally attached to a front part of the trunk lid 11B and that is tiltable frontward and downward together with the trunk lid 11B.

The back rest lower component 16L has: a back surface support part 16La that supports the back surface of the lumbar of the passenger; and a pair of right and left side support parts 16Lb that are moderately curved frontward from right and left side portions of the back surface support part 16La and that support the sides of the lumbar of the passenger.

Similarly, the back rest upper component 16U has: a back surface support part 16Ua that supports the back surface of the lumbar of the passenger; and a pair of right and left side support parts 16Ub that support the sides of the lumbar of the passenger. The side support part 16Ub of the back rest upper component 16U is formed so as to expand laterally and frontward to have a shoulder shape from the substantially middle in the vertical direction of the back surface support part 16Ua. A slant surface 18 that is slanted downward toward the frontward direction is provided on the front expansion portions of the right and left side support parts 16Ub of the back rest upper component 16U. The right and left arm rests 17 are provided to protrude at a position that is opposed to the slant surface 18 (side rear position of the seat 10).

Figure 4:
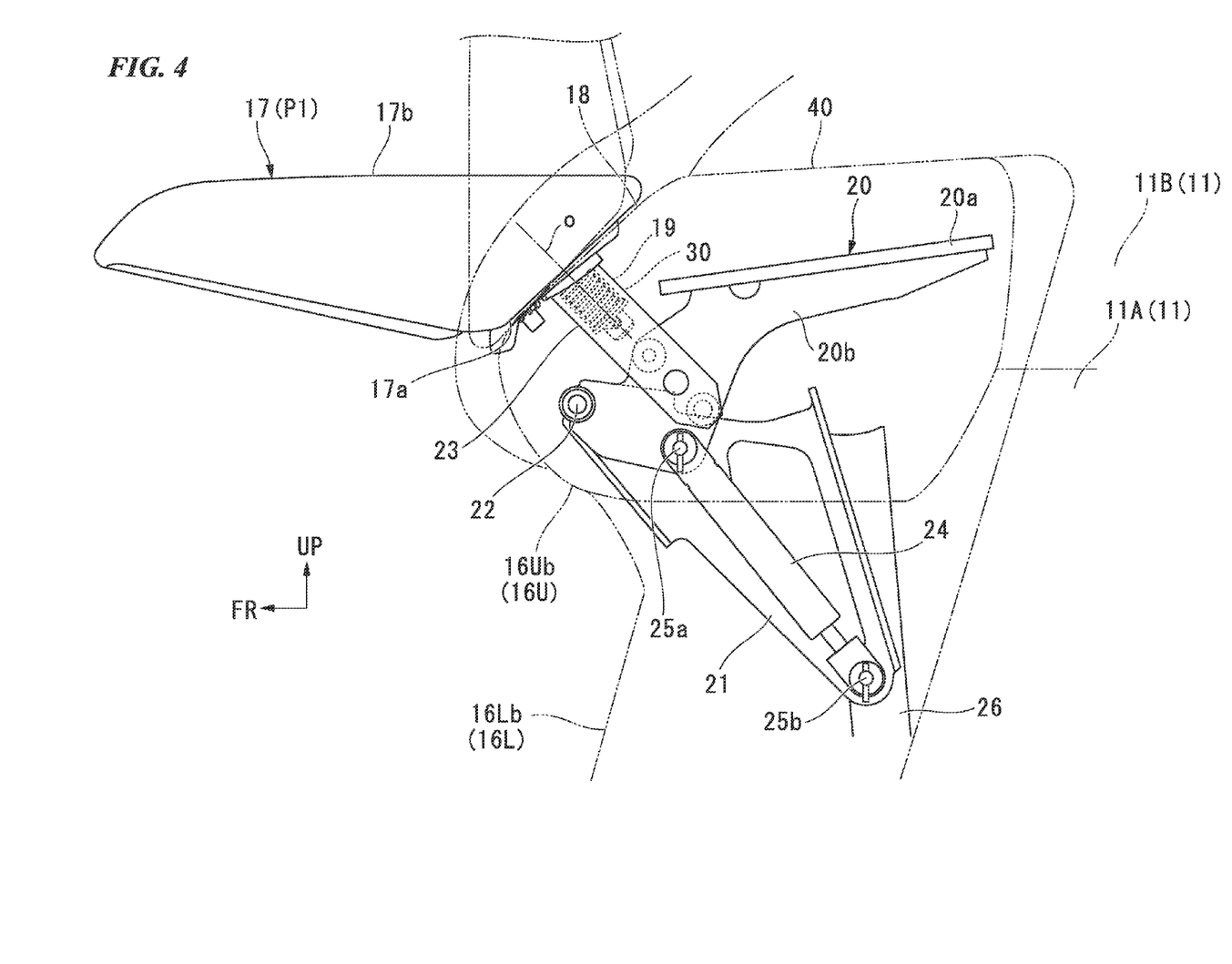
FIG. 4 is a side view showing an arm rest arrangement part of the saddle riding type vehicle according to the embodiment.
Figure 5:
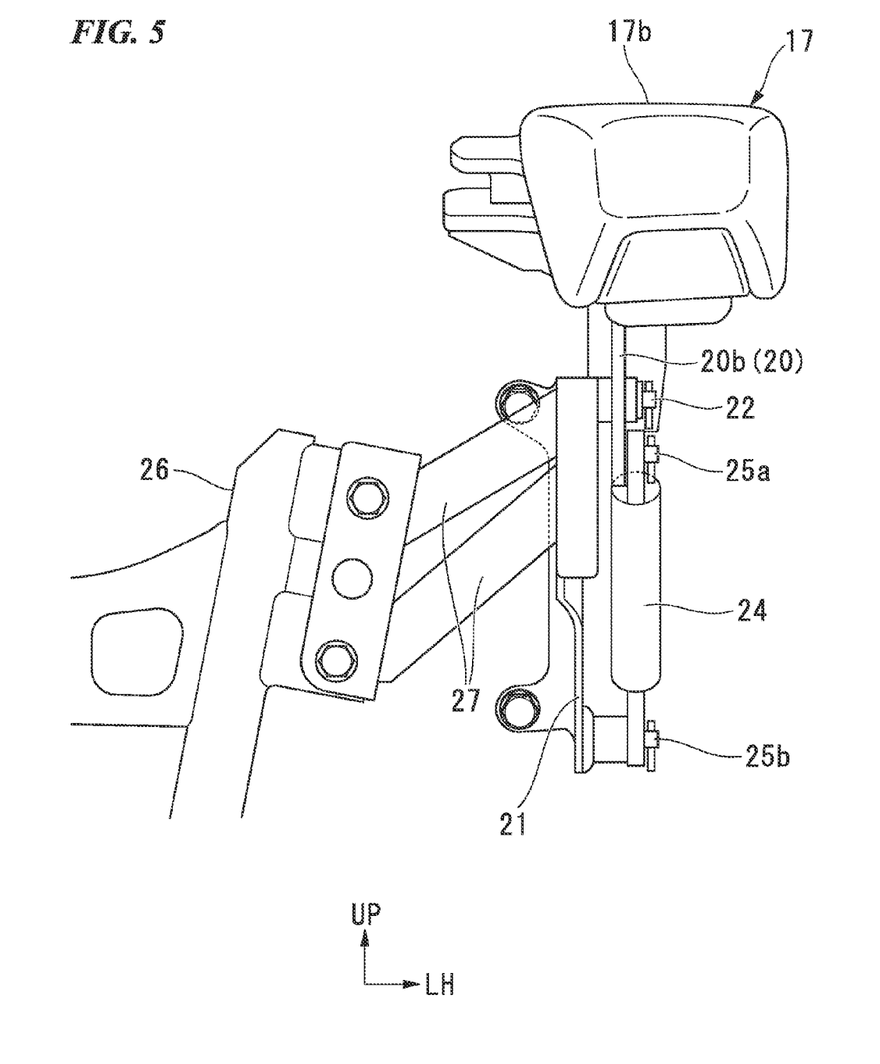
FIG. 5 is a front view showing the arm rest arrangement part of the saddle riding type vehicle according to the embodiment.

FIG. 4 is a view of the arm rest 17 and the arrangement part of the arm rest 17 seen from the left of the vehicle in a state where part of the components is removed. FIG. 5 is a view of the arm rest 17 and the arrangement part of the arm rest 17 seen from the front of the vehicle in a state where part of the components is removed.

As shown in FIG. 4, the arm rest 17 has: a base wall 17a that is arranged to be opposed to the slant surface 18 of the side support part 16Ub of the back rest upper component 16U; a load support wall 17b on which the arm of the passenger is rested; and a rotation shaft 19 that protrudes in a direction substantially orthogonal to the base wall 17a from the base wall 17a. The rotation shaft 19 penetrates through the slant surface 18 of the side support part 16Ub and is rotatably held in both right and left side parts of the trunk lid 11B. The reference numeral o in FIG. 4 refers to the shaft center (axial line) of the rotation shaft 19.

The arm rest 17 is made to be rotatable around the axial line o of the rotation shaft 19 between a use position P1 (refer to FIGS. 1, 3, 4, and 7) at which a front end part of the load support wall 17b (front end part of the arm rest 17) is directed to a vehicle body front direction and a retracted position P2 (refer to FIGS. 1, 3, 4, and 7) at which the front end part of the load support wall 17b (front end part of the arm rest 17) is directed to a vehicle body upper direction. The rotation shaft 19 is arranged so as to be directed to a vehicle body front upper direction in a state where the trunk lid 11B is closed.

When the trunk lid 11B is closed and the arm rest 17 is at the use position P1, the front end part of the load support wall 17b extends substantially horizontally in the vehicle body front direction in a state where the load support wall 17b faces in the vehicle body upper direction. When the trunk lid 11B is closed and the arm rest 17 is at the retracted position P2, the front end part of the load support wall 17b extends substantially vertically in the vehicle body upper direction in a state where the load support wall 17b faces in the vehicle body front direction.

The front edge portion of the side support part 16Ub of the back rest upper component 16U has an upper surface 40. The front edge portion of the side support part 16Ub of the back rest upper component 16U is formed so as to have a shape in which the upper surface 40 continues smoothly to the upper surface of the load support wall 17b of the arm rest 17 when the arm rest 17 is at the use position.

The rotation shaft 19 of the right arm rest 17 is attached to a right front edge part of the trunk lid 11B. The rotation shaft 19 of the left arm rest 17 is attached to a left front edge part of the trunk lid 11B. The rotation shaft 19 is held by a stay 20 that supports the trunk lid 11B. The stay 20 has: a fixation wall 20a that is fixed to an inner surface of the trunk lid 11B; and an extension wall 20b that is bent downward at a substantially right angle from the fixation wall 20a and extends in the frontward and downward direction. An end part in the extension direction of the extension wall 20b is supported rotatably around an axis 22 by a bracket 21 that is fastened to be fixed to right and left inner front parts of the trunk main body 11A. The axis 22 is an axis that is arranged along the vehicle width direction. The axis 22 connects the trunk lid 11B rotatably to a front part of the trunk main body 11A via the stay 20.

A shaft support member 23 (holding part of the rotation shaft) that supports rotatably the rotation shaft 19 of the arm rest 17 is fastened to be fixed to the extension wall 20b of the stay 20. An upper connection part 25a of a damper 24 is connected to a lower part of the fastened position of the shaft support member 23. The damper 24 is a member for adding a buffer effect to the stay 20 when the trunk lid 11B is operated to be opened and closed. A lower end connection part 25b of the damper 24 is connected to a lower end vicinity part of the bracket 21.

As shown in FIG. 3 and FIG. 5, a back rest support frame 26 that supports the back of the back rest 16 is provided to protrude on the trunk stay 12 of the vehicle body frame F at a front position of the trunk main body 11A. As shown in FIG. 5, a support arm 27 that extends toward the front and outward in the vehicle width direction is provided on the back rest support frame 26. The bracket 21 inside the trunk main body 11A is joined to an extension end of the support arm 27. Accordingly, right and left front edge parts of the trunk main body 11A is supported by the back rest support frame 26 via the bracket 21 and the support arm 27.

Figure 6:
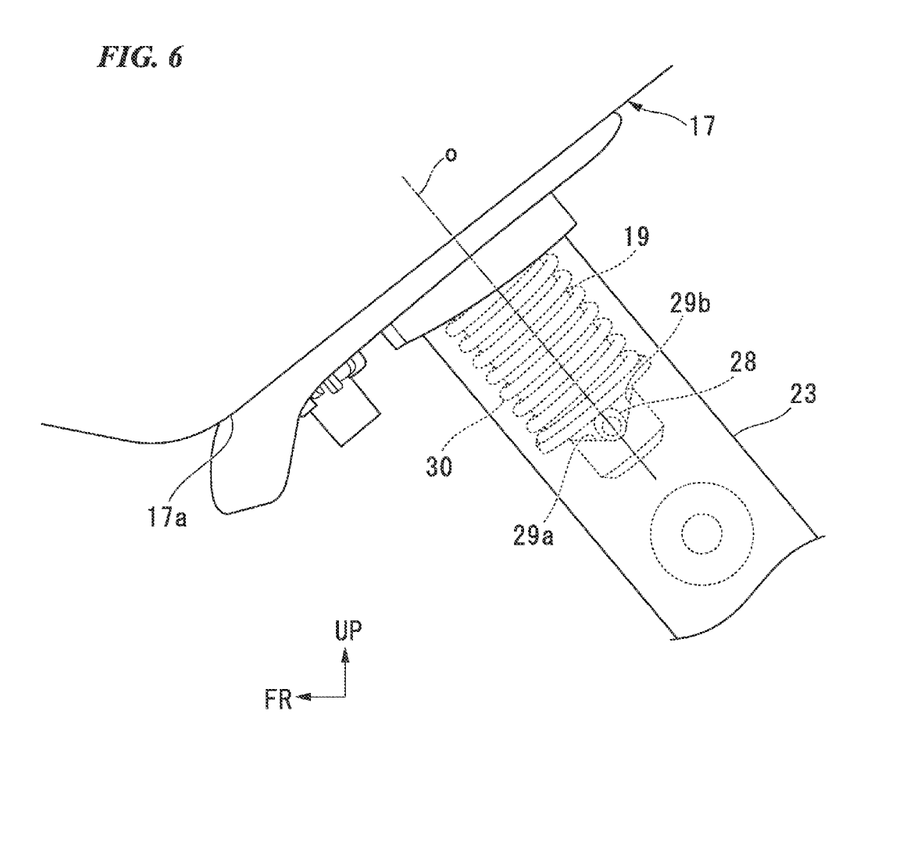
FIG. 6 is an enlarged side view of part of the arm rest arrangement part of the saddle riding type vehicle according to the embodiment.

FIG. 6 is an enlarged view showing a side part of the shaft support member 23 that supports the rotation shaft 19 of the arm rest 17.

As shown in FIG. 6, the rotation shaft 19 of the arm rest 17 is supported rotatably inside the shaft support member 23. A guide protrusion 28 that is provided to protrude on a lower end outer circumferential surface of the rotation shaft 19 of the arm rest 17 is in slidably contact with guide slant surfaces 29a, 29b provided inside the shaft support member 23. In the rotation shaft 19, the guide protrusion 28 is biased by a biasing spring 30 and comes into contact with the guide slant surfaces 29a, 29b. In the present embodiment, the arm rest 17 is rotated and displaced between the use position and the retracted position as described above, and further, the rotation shaft 19 is rotatable also in any of right and left directions from the use position of the arm rest 17.

Figure 7A:
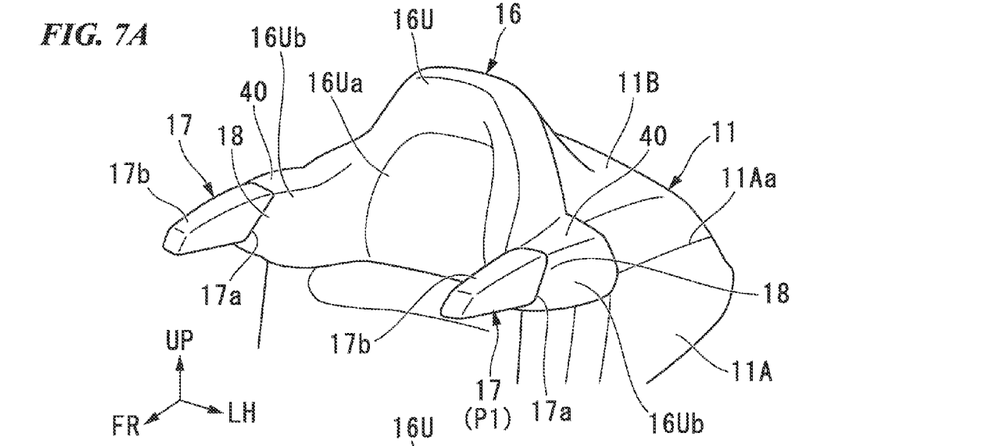
FIG. 7A is a perspective view showing an operation of the arm rest of the saddle riding type vehicle according to the embodiment.
Figure 7B:
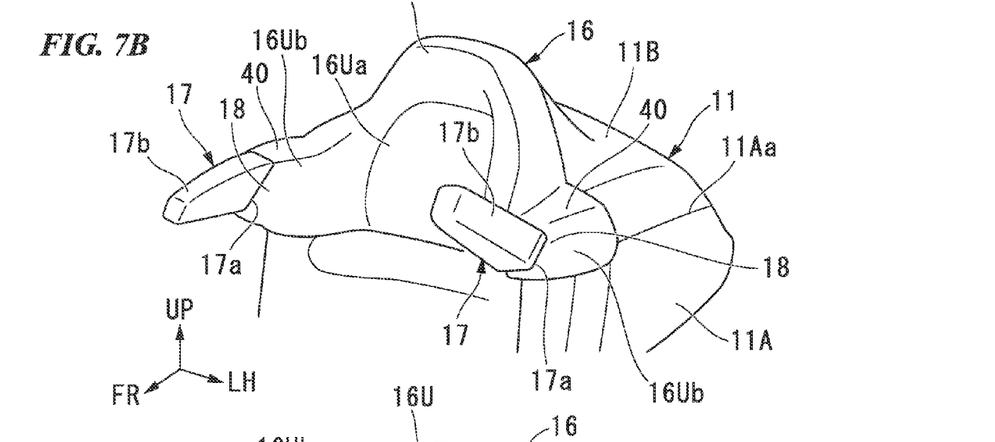
FIG. 7B is a perspective view showing the operation of the arm rest of the saddle riding type vehicle according to the embodiment.
Figure 7C:
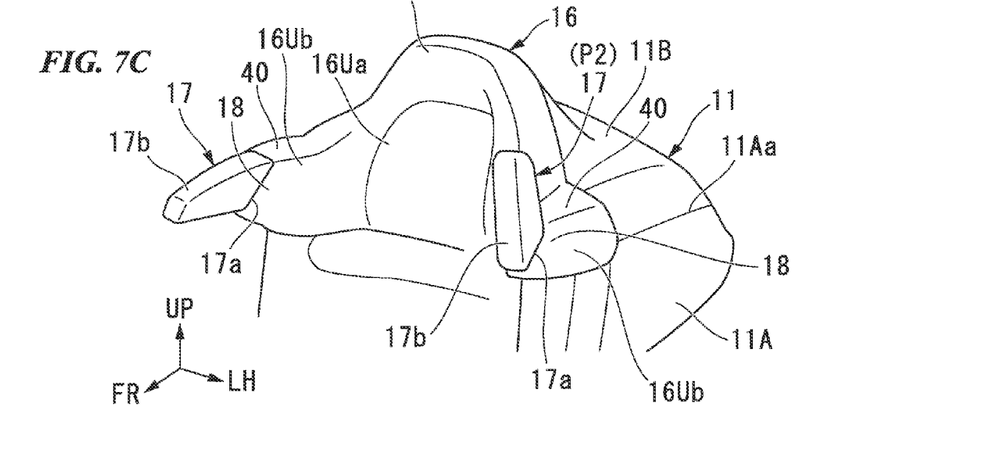
FIG. 7C is a perspective view showing the operation of the arm rest of the saddle riding type vehicle according to the embodiment.

FIGS. 7A to 7C are views in which the operation when the left arm rest 17 at the use position is rotated and displaced to the retracted position are shown in the order of FIG. 7A, FIG. 7B, and FIG. 7C.

As shown in FIG. 7A, in the left arm rest 17 at the use position, the load support wall 17b faces in the vehicle body upper direction, and the front end part of the left arm rest 17 is directed to the vehicle body front direction. In this state, the passenger who is seated on the seat 10 can rest the arm stably on the upper surface of the load support wall 17b.

From this state, when the arm rest 17 is displaced to the retracted position, for example, as shown in FIG. 7B and FIG. 7C, the arm rest is rotated in a clockwise direction when seen from the front around the rotation shaft 19 (refer to FIG. 4 and FIG. 6). Thereby, the arm rest 17 is rotated around the rotation shaft 19 while maintaining a state in which the base wall 17a is parallel to the slant surface 18 of the side support part 16Ub, and the front end part of the arm rest 17 is directed to the vehicle body upper direction while the load support wall 17b faces in the vehicle body front direction. Accordingly, in this state, the passenger can easily mount on and dismount from the seat 10.

In the above description, the arm rest 17 is rotated in a clockwise direction when seen from the front such that the arm rest 17 is displaced to the retracted position; however, the arm rest 17 may be rotated in a counterclockwise direction when seen from the front such that the arm rest 17 is displaced to the retracted position.

As described above, in the motorcycle 1 according to the present embodiment, the rotation shaft 19 of each arm rest 17 is arranged so as to be directed to the vehicle body front upper direction from the side rear position of the seat 10. Therefore, if necessary, the arm rest 17 can be displaced freely between the use position and the retracted position around the rotation shaft 19.

In the motorcycle 1 according to the present embodiment, the rotation shaft 19 of each arm rest 17 is arranged so as to be directed to the vehicle body front upper direction from the side rear position of the seat 10, and therefore, when a large load is input from a side of the arm rest 17 in a state where the arm rest 17 is at the use position, the arm rest 17 is rotated and displaced to the retracted position direction around the rotation shaft 19. Accordingly, in the case of the motorcycle 1 according to the present embodiment, it is possible to reduce a load that acts on the arm rest 17 when a large load is input from the side of the arm rest 17 in a state where the arm rest 17 is at the use position.

Further, in the motorcycle 1 according to the present embodiment, the rotation shaft 19 of each arm rest 17 is arranged so as to be directed to the vehicle body front upper direction from the side rear position of the seat 10, and therefore, it is possible to prevent the holding part of the rotation shaft 19 from greatly protruding in the vehicle body front direction. Accordingly, the holding part of the rotation shaft 19 does not easily cause a problem for the passenger to mount and dismount, and it is possible to enhance the easiness for the passenger to mount and dismount.

Further, in the motorcycle 1 according to the present embodiment, the arm rest 17 is held by the trunk lid 11B such that rotation in both right and left directions around the rotation shaft 19 is allowed. Therefore, even when an external force is input from any of the inner and outer directions in the vehicle width direction when the arm rest 17 is at the use position, the arm rest 17 is rotated in a direction that corresponds to the load input direction, and it is possible to divert the input load. Accordingly, even when the passenger forgets to displace the arm rest 17 to the retracted position in advance and mounts on or dismounts from the seat 10, it is possible to displace the arm rest 17 smoothly to the retracted position when the passenger comes into contact with the arm rest 17. Accordingly, when the configuration is adopted, it is possible to facilitate mounting on and dismounting from the seat 10 of the passenger.

In the motorcycle 1 according to the present embodiment, the trunk main body 11A is arranged at a rear part of the seat 10, the trunk lid 11B is supported to be openable and closeable on the front part of the trunk main body 11A such that the rear part of the trunk lid 11B is opened, and the rotation shaft 19 of the arm rest 17 is held by the stay 20 of the trunk lid 11B such that the arm rest 17 is directed to the vehicle body upper direction at the retracted position. Therefore, by displacing the right and left arm rests 17 in advance to the retracted position at which the arm rest 17 is directed to the vehicle body upper direction, it is possible to greatly rotate the trunk lid 11B frontward to be opened without causing interference between the arm rest 17 and another front member. Accordingly, it is also possible to ensure a sufficiently wide opening angle of the trunk lid 11B while maintaining the extension length of the arm rest 17 to be long. Therefore, in the motorcycle 1 according to the present embodiment, it is also possible to improve the usability of the trunk lid 11B by the sufficiently wide opening angle of the trunk lid 11B while ensuring the arm resting stability by the sufficiently long extension length of the arm rest 17.

Further, in the motorcycle 1 according to the present embodiment, the shaft support member 23 that holds the rotation shaft 19 of the arm rest 17 is arranged inside the trunk lid 11B without protruding outside in the front direction of the trunk lid 11B. Therefore, it is possible to make the extension length of the arm rest 17 to be sufficiently long by the amount in which the shaft support member 23 does not protrude outside in the front direction of the trunk lid 11B. Accordingly, in the motorcycle 1 according to the present embodiment, the maximally protruding position in the vehicle body front direction of the arm rest 17 when the arm rest 17 is displaced to the retracted position can be made to be a further rear position, and therefore, it is possible to satisfy, at a further high level, both of ensuring the arm resting stability of the arm rest 17 and improvement of the usability of the trunk lid 11B.

Further, in the motorcycle 1 according to the present embodiment, the upper surface 40 of the front edge portion of the side support part 16Ub of the back rest 16 that is arranged on the front part of the trunk lid 11B is formed in a shape in which the upper surface 40 continues to the upper surface of the load support wall 17b of the arm rest 17 at the use position. Accordingly, in the case of the motorcycle 1 according to the present embodiment, the front edge portion of the side support part 16Ub of the back rest 16 can also be used as the arm rest, and the arm resting stability of the passenger is further enhanced.

Figure 8:
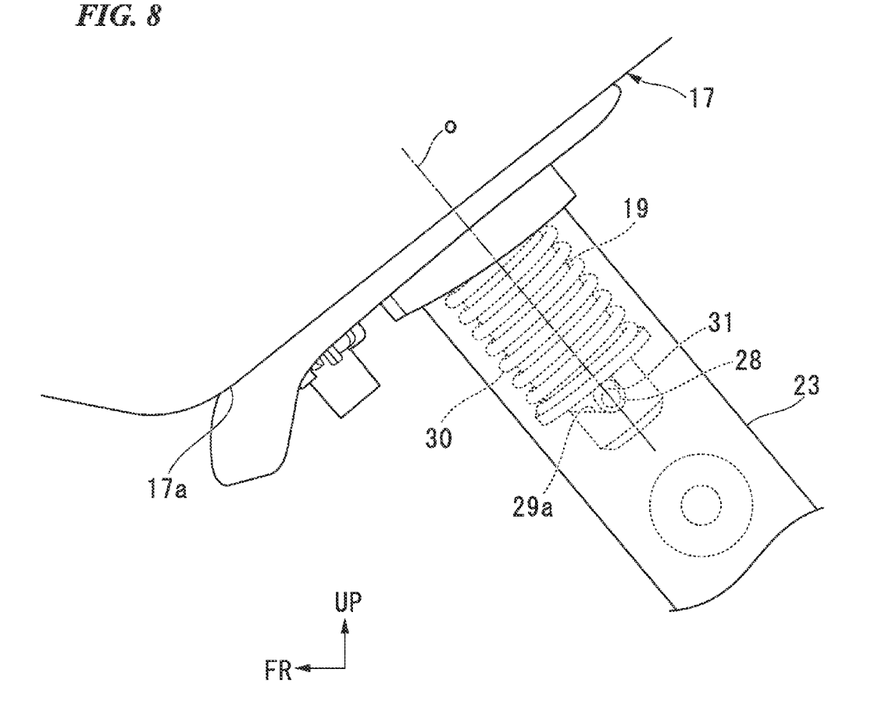
FIG. 8 is an enlarged side view of part of an arm rest arrangement part according to another embodiment of the present invention.

The present invention is not limited to the above embodiment, and various design changes can be made without departing from the scope of the invention. For example, in the above embodiment, the rotation shaft 19 of the arm rest 17 is rotatable in any of right and left directions from the use position; however, the rotation shaft 19 of the arm rest 17 may be rotatable in only any one of right and left directions from the use position. In this case, for example, as shown in FIG. 8, a regulation wall 31 that regulates the rotation displacement of the guide protrusion 28 from the use position may be provided inside the shaft support member 23. In FIG. 8, the same reference numerals are given to the common parts with the embodiment shown in FIG. 1 to FIG. 7.

Further, in the above embodiment, the position at which the front end part of the arm rest 17 is directed to the upper direction is the retracted position of the arm rest 17; however, the retracted position of the arm rest 17 may be not necessarily the position at which the front end part of the arm rest 17 is directed to the upper direction and may be a position at which the front end part of the arm rest 17 is directed to a direction other than the vehicle front direction.

Further, the saddle riding type vehicle according to the present invention includes not only a motorcycle (including a motorized bicycle and a scooter-type vehicle) but also a three-wheeled vehicle having one front wheel and two rear wheels, a four-wheeled vehicle, and the like.

The invention claimed is:

1. A saddle riding vehicle comprising:
   a seat which is supported by a vehicle body and on which a passenger is seated;
   an arm rest which is provided to protrude at a side rear position of the seat of the vehicle body and on which an arm of a passenger who is seated on the seat is rested,
   a trunk main body that is arranged at a rear part of the seat and that has an upper part having a goods storage opening; and
   a trunk lid that is supported rotatably on a front part side of the goods storage opening by the trunk main body and that opens and closes the goods storage opening such that a rear part of the trunk lid is opened, wherein the arm rest is supported by the vehicle body rotatably between a use position at which a front end part of the arm rest is directed to a vehicle body front direction and a retracted position at which the front end part of the arm rest is directed to a direction other than the vehicle body front direction,
   a rotation shaft of the arm rest is arranged to be directed to a vehicle body front upper direction from the side rear position of the seat of the vehicle body, and
   the rotation shaft is held by a stay that supports the trunk lid such that the arm rest is directed to an upper direction of the vehicle body at the retracted position.

2. The saddle riding vehicle according to claim 1, wherein the arm rest is supported by the vehicle body such that rotation in both right and left directions around the rotation shaft from a state where the arm rest is at the use position is allowed.

3. The saddle riding vehicle according to claim 1, wherein a holding part of the rotation shaft is arranged inside the trunk lid.

4. The saddle riding vehicle according to claim 3, wherein a back rest that supports a dorsal region of the passenger who is seated on the seat is provided on a front part of the trunk lid, and
the back rest is formed in a shape in which the back rest continues to the arm rest at the use position.

5. The saddle riding vehicle according to claim 1, wherein a back rest that supports a dorsal region of the passenger who is seated on the seat is provided on a front part of the trunk lid, and
the back rest is formed in a shape in which the back rest continues to the arm rest at the use position.

* * * * *